March 2, 1965 TATUO ASAMAKI 3,172,009
VOLTAGE SUPPLY CIRCUIT FOR COLD CATHODE IONIZATION
GAUGE TYPE VACUUM PUMP
Filed Jan. 17, 1961

INVENTOR
TATUO ASAMAKI
BY Roy C. Hopgood
ATTORNEYS

United States Patent Office 3,172,009
Patented Mar. 2, 1965

3,172,009
VOLTAGE SUPPLY CIRCUIT FOR COLD CATHODE IONIZATION GAUGE TYPE VACUUM PUMP
Tatuo Asamaki, Tokyo, Japan, assignor to Nippon Electric Company, Limited, Tokyo, Japan, a corporation of Japan
Filed Jan. 17, 1961, Ser. No. 83,304
2 Claims. (Cl. 315—273)

This invention relates to a voltage supply circuit for a cold cathode ionization gauge type vacuum pump.

The vacuum obtained in a particular period of time and the speed of pumping of a cold cathode ionization gauge type vacuum pump, such as that described in copending application Serial No. 41,655 filed July 8, 1960, and assigned to Nippon Electric Company, are directly dependent on the voltage impressed on the pump. As the voltage is decreased, the pumping speed is also decreased and the pump's operating range is narrowed.

Conventional voltage supplies for operating a vacuum pump produce a direct current voltage which is half-wave rectified and impressed on the pump. At the level of vacuum in the pump at the start of pumping no problem is encountered in pump operation. However, as the vacuum becomes greater, the internal resistance of the pump decreases and the current flow through the pump increases overheating it.

To prevent this overheating, it has been necessary to lower the impressed voltage, thereby reducing the speed of pumping and the vacuum obtained by the pump.

Accordingly, it is an object of the invention to provide a circuit for supplying voltage for operating a cold cathode ionization gauge type vacuum pump which increases the pumping speed at low vacuum levels over that obtainable with conventional voltage supplies.

It is another object of the invention to provide a circuit for supplying operating voltage for such a pump which does not require a lowering of the impressed voltage on the pump to prevent overheating.

It is a further object of the invention to provide a voltage supply circuit which automatically regulates the intermittency of current flow through the pump thereby increasing the pumping speed at greater levels of vacuum and extending the possible operating range of the pump, as compared to one utilizing a conventional voltage source.

In accordance with an aspect of the invention, there is provided a source of applied voltage which is coupled through control circuitry and impressed as a rectified voltage across a vacuum pump. At the vacuum condition at the beginning of the pumping operation when the internal resistance of the pump is high, the rectified high voltage is sppplied directly to the pump after being filtered. However, as the level of the vacuum becomes greater with pumping, the internal resistance of the pump gradually decreases. The manner of operation of the voltage supply circuit of the invention is controlled by this internal resistance so that the current flow fed to the pump is dependent upon the value thereof.

The above mentioned and other features and objects of this invention and the manner of attaining them become more apparent and the invention itself will be best understood by reference to the following description of an embodiment of the invention taken in conjunction with the accompanying drawing, wherein.

Figure 1:
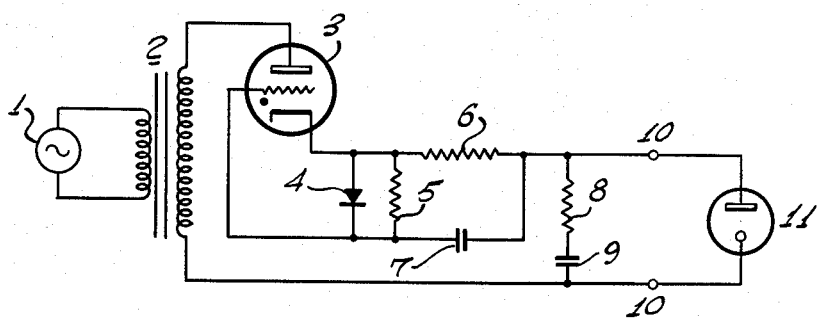
FIG. 1 is a circuit diagram of the voltage supply circuit of the invention.

Referring now to FIG. 1, the novel circuit comprises an alternating current generator 1 which is coupled to a transformer 2. The secondary winding of the transformer is coupled to the vacuum pump 11 at the terminals 10 through a grid controlled discharge tube 3, such as a thyratron, and a resistor 6. A firing control circuit comprising the diode 4, high resistance resistor 5 and condenser 7 are connected in the cathode to grid circuit of the thyratron for controlling the bias voltage and thus the firing characteristics of the tube. A filter is connected across the pump 11, which comprises a resistor 8 and a condenser 9.

During the initial operation of the circuit, the voltage developed across the secondary winding of the transformer 2 is applied across the tube 3 to fire it. Tube 3 rectifies the voltage and it is applied to the pump 11 after being filtered by resistor 8 and condenser 9. Since the resistance of the pump is high, when the vacuum pumping operation is started, the voltage drop across the pump 11 is also high, whereas the voltage drop across the tube 3 is low. As a result, the bias voltage developed by the firing control circuit has only a negligible effect on the firing of the tube 3.

Figure 2:
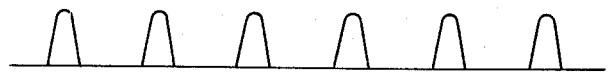
FIG. 2 illustrates the waveform of the current flow through the vacuum pump when operating at a poor vacuum condition; and, FIG. 3 is an example of the waveform of the current flow through the vacuum pump at a greater vacuum condition.

The waveform of the current flow through the pump 11, during the high resistance condition is shown in FIG. 2. The current pulses flow at a particular periodicity to lower the level of the vacuum is the pump, the intermittency of current flow depending primarily on the applied voltage.

As the vacuum level becomes greater, the resistance of the pump decreases causing the voltage drop across the pump to decrease. Simultaneously, the voltage drop across the tube 3 increases and the effect of the bias voltage also increases to counteract the effect of the applied voltage in firing the tube 3. This increased effect of the bias voltage occurs automatically as the rate of charging is faster than the rate of discharging of the condenser 7.

The condenser 7 is charged through the diode 4 and the voltage is applied to the grid of tube 3, preventing the tube from firing. The resistor 5 acts as a bleeder to permit this charge to leak-off the grid in a particular period of time, so that the tube 3 may be fired by the subsequently applied voltage. Thus, when a good vacuum level is achieved by the pump, the firing of the tube 3 is controlled by both the applied voltage and the bias voltage developed by the firing control circuit.

Figure 3:
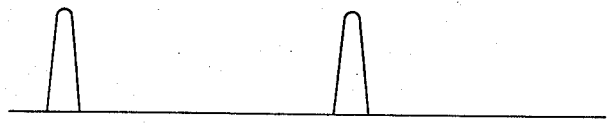

If the time constants of the components of the firing control circuit are properly chosen, the intermittence of current flow in the pump 11 is controlled, so that overheating of the pump does not occur. As shown in FIG. 3, the periods between the passage of current are made longer as the vacuum achieved by the pump becomes greater. Moreover, the voltage impressed on pump 11 is maintained at a constant level, permitting the speed of pumping and the operating range of the pump to be increased over that obtainable with a conventional voltage supply.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A circuit for supplying operating voltage to a cold cathode ionization gauge type vacuum pump comprising a pair of input terminals for connection to a source of alternating voltage and a pair of output terminals for connection to the pump, a gas discharge tube and a first resistor connected in series between one of said pair of input terminals and one of said pair of output terminals, said tube having an anode, a cathode and a control grid, said anode being connected to said one input terminal and said cathode being connected to said one output terminal through said first resistor, the other of said pair of input terminals being connected to the other of said pair of output terminals, a short time-constant charging circuit including a diode and a capacitor connected in series between said cathode and said one output terminal, said diode also being connected in the forward conducting direction from said cathode to said grid, the anode of said diode being connected to said cathode of said tube, a relatively long time-constant discharging circuit connected between said cathode and said one output terminal and including a second resistor in series with said capacitor, and said grid being connected to a point of connection common to said diode, said capacitor and said second resistor, said short time constant charging circuit and said long time constant discharging circuit comprising a biasing circuit to control the firing of said tube, whereby said capacitor is charged rapidly during the discharge of said tube in the direction to retard subsequent firing of said tube and said charge is retained to bias said tube against discharge for a period of time dependent on the internal resistance of said pump and the charge on said capacitor.

2. The invention described in claim 1 which further includes a ripple filter comprising a serially connected resistance and capacitance connected between said output terminals.

References Cited by the Examiner
UNITED STATES PATENTS

| | | | |
|---|---|---|---|
| 2,002,281 | 5/35 | Stansbury | 315—273 |
| 2,003,992 | 6/35 | Cockrell | 315—273 |
| 2,022,465 | 11/35 | Hansell | 313—7.3 |
| 2,078,691 | 4/37 | Schulze | 315—273 |
| 2,494,747 | 1/50 | Drugmand | 315—273 |
| 2,517,131 | 8/50 | Phillipi et al. | 315—273 |
| 2,524,925 | 10/50 | Parsons | 315—273 |
| 2,791,688 | 5/57 | Cutler et al. | 328—67 |
| 3,084,284 | 4/63 | Schultz et al. | 328—9 |

JOHN W. HUCKERT, *Primary Examiner.*